United States Patent [19]

Reischl

[11] Patent Number: 4,595,709

[45] Date of Patent: Jun. 17, 1986

[54] PROCESS FOR THE PRODUCTION OF ISOCYANATE POLYADDITION PRODUCTS

[75] Inventor: Artur Reischl, Leverkusen, Fed. Rep. of Germany

[73] Assignee: Bayer Aktiengesellschaft, Leverkusen, Fed. Rep. of Germany

[21] Appl. No.: 250,451

[22] Filed: Apr. 2, 1981

[30] Foreign Application Priority Data

Apr. 23, 1980 [DE] Fed. Rep. of Germany ....... 3015576

[51] Int. Cl.$^4$ .............................................. C08G 18/14
[52] U.S. Cl. ..................... 521/79; 264/45.9; 264/39; 264/176 R; 264/211; 264/DIG. 69; 264/DIG. 77; 521/160; 521/170; 521/917; 528/67; 528/71; 528/85
[58] Field of Search ................. 521/160, 170, 79, 917; 528/67, 71, 85; 264/45.9, 39, 176 R, 211, DIG. 69, DIG. 77

[56] References Cited

U.S. PATENT DOCUMENTS

| | | | |
|---|---|---|---|
| 3,180,852 | 4/1965 | Pfirschke et al. | 260/77.5 |
| 3,897,314 | 7/1975 | Liebsch et al. | 203/89 |
| 4,143,008 | 3/1979 | Zwolinski et al. | 260/18 TN |
| 4,251,638 | 2/1981 | Reischl | 521/128 |

FOREIGN PATENT DOCUMENTS 895058 4/1967 Fed. Rep. of Germany.
1508317 3/1968 United Kingdom.

OTHER PUBLICATIONS

Mo-1996-CIP Specification, pages 1 thru 35a and Abstract of the Disclosure, Ser. No. 169,589, filed 10-27-81.

Primary Examiner—Maurice J. Welsh
Attorney, Agent, or Firm—Gene Harsh; Joseph C. Gil; Lyndanne M. Whalen

[57] ABSTRACT

Polyaddition products containing urethane groups are produced by reacting an isocyanate group containing distillation residue with a compound having a molecular weight less than 600 containing at least two alcoholic hydroxyl groups. The distillation residue is obtained in the commercial production of tolylene diisocyanate. The distillation residue and hydroxyl compound are reacted in amounts such that the NCO/OH equivalent ratio is less than 1.5:1. The polyaddition reaction is carried out at a temperature in the range of 50° to 220° C. The reaction is carried out in a reaction screw extruder preferably having self-cleaning screw geometry. The polyaddition products are useful as molding compositions, reactive fillers and starting materials in the production of flame-resistant polyurethane plastics.

16 Claims, No Drawings

PROCESS FOR THE PRODUCTION OF ISOCYANATE POLYADDITION PRODUCTS

BACKGROUND OF THE INVENTION

The present invention relates to a process for the continuous production of isocyanate polyaddition products containing urethane groups. These polyaddition products are made from branched or cross-linked distillation residues which residues are substantially free from monomer but still contain free isocyanate groups and short-chain compounds containing alcoholic hydroxyl groups. Such distillation residues may be obtained from the commercial production of tolylene diisocyanates. The polyaddition products obtained in accordance with the present invention are useful as starting materials for the production of plastics (e.g., molding compositions) and as reactive fillers for a variety of plastics because they impart increased flame resistance and improved physical properties to the product plastics.

The distillation of the phosgenation product of tolylene diamines under industrial conditions is accompanied by formation of relatively high molecular weight, insoluble derivative products containing uretdione, isocyanurate, carbodiimide, uretone imine, urea and biuret groups. Methyl benzimidazolones formed during phosgenation are also gradually biuretized with the free isocyanate groups present to form insoluble, cross-linked products.

In recent years, these distillation residues from the industrial production of tolylene diisocyanate (hereinafter referred to as "TDI") have been partly recycled by alkaline hydrolysis. However, only a relatively small proportion of tolylene diamine is recovered by this extremely slow hydrolysis reaction after an expensive purification process.

The long-tube vertical evaporator described in DE-OS No. 2,035,731 has been more successful in maximizing the yield of 2,4-TDI ("T 100") and of isomer mixtures of 80% of 2,4-TDI and 20% of 2,6-TDI ("T 80") and of 65% of 2,4-TDI and 35% of 2,6-TDI ("T 65"), based in each case on the tolylene diamine used. Such evaporators produce reduced quantities of a sump phase which is substantially free from monomers yet still contains approximately 25% by weight of free isocyanate groups (hereinafter referred to as "TDI residue tar"). This sump phase is frequently "denatured" with water so that the free isocyanate groups still present in the TDI residue tar react with the water to form carbon dioxide and additional urea and biuret groups. After this denaturing, only a small amount (generally about 1 to 10% by weight) of free isocyanate groups is left over. These cross-linked, substantially monomer-free products treated with water are hereinafter referred to as "denatured" TDI distillation residues. On storage in water or in moist form, the isocyanate content of the denatured TDI residue gradually decreases over long periods of time.

The slag-like denatured TDI residues thus obtained, contain polyurethane, biuret, uretdione, carbodiimide and isocyanurate groups. These denatured residues are completely insoluble in all standard solvents unlike the comparatively low molecular weight (but non-storable) sump phase rich in NCO-groups before denaturing with water. Such denatured TDI residues begin to melt at temperatures above 250°±30° C., and decompose with evolution of gas. These denatured TDI residue tars may be subjected to subsequent chemical modification and mechanical size reduction to convert them into starting materials and reactive fillers for the production of plastics.

TDI distillation residues have also been subjected to polyaddition reaction between the TDI residue tar and a low molecular weight polyol. If this polyaddition reaction is carried out by the known casting process, an almost explosive exothermic reaction takes place when ethylene glycol or diethylene glycol is added because this operation is carried out at temperatures above the melting point of the TDI residue tar (generally above 100° C.). Even when less than 0.5 kg of residue are reacted, the temperature rises above 200° C. and the residue partially decomposes and becomes brittle. Use of greater amounts of residue in the reaction mixture may result in temperatures high enough to cause smoldering of the decomposition products.

Use of an inert solvent to dissipate the heat of reaction has been found to be impractical because the cross-linked polyaddition products formed during the reaction accumulate a coarse slag from which the liquid reaction medium cannot be removed to the point of odorlessness, even after expensive size reduction. Additionally, such solvents are ecologically and economically disadvantageous.

SUMMARY OF THE INVENTION

It is an object of the present invention to provide a process for the production of isocyanate polyaddition products.

It is also an object of the present invention to provide a continuous process for the production of isocyanate polyaddition products from distillation residues obtained from the commercial production of tolylene diisocyanates.

It is a further object of the present invention to provide a continuous process for the production of isocyanate polyaddition products from distillation residues obtained from the commercial production of tolylene diisocyanates in which the residue need not be denatured with water.

It is another object of the present invention to provide a continuous process for the production of isocyanate polyaddition products useful in the production of plastics.

These and other objects which will be apparent to those in the art are accomplished by converting TDI residue tars which are not denatured with water (i.e., still contain relatively large quantities of free isocyanate groups) directly into polyaddition products containing urethane groups by continuously reacting the residue with low molecular weight compounds containing hydroxyl groups. This conversion is preferably carried out in multiple-screw extruders with a self-cleaning screw geometry under conditions described in more detail hereinafter.

DETAILED DESCRIPTION OF THE INVENTION

The present invention relates to a process for the production of polyaddition products containing urethane groups in which isocyanate-group-containing distillation residues from the industrial production of TDI are reacted with polyhydroxyl compounds. The TDI residue tar should contain less than 12% by weight of monomeric TDI and is preferably substantially free from monomers (i.e., less than 6 wt. % monomer). This residue which accumulates as sump phase in the removal of monomeric TDI from the crude phosgenation product of tolylene diamines, has a free NCO-group content which is less than 35% by weight, preferably less than 30% by weight and most preferably less than 27% by weight. This residue should also have a softening point below 200° C., preferably within the range from 50° to 160° C. This TDI residue is reacted continuously with a compound containing at least two alcoholic hydroxyl groups and having an average molecular weight below 600, preferably a glycol having a molecular weight of from 62 to 300. The TDI residue and hydroxyl compound are reacted in amounts such that the NCO/OH equivalent ratio is less than 1.5:1, preferably between 0.4:1 and 1:1 and, most preferably, between 0.75:1 and 0.95:1. This reaction is carried out in a reaction extruder with preferably self-cleaning screw geometry at temperatures in the range from 50° to 220° C. and preferably at temperatures in the range from 70° to 180° C. Additives known to those in the art may also be included in the reaction mixtures.

It is particularly surprising that, despite the polyfunctionality of the starting components and the considerable heat of reaction generated in the process according to the present invention, polyaddition products in granulated or powdered form are obtained. These product powders are particularly suitable for thermoplastic processing and may be molded under pressure to form shaped articles having unexpectedly good mechanical properties. It is also possible to use the polyaddition products in finely ground form as reactive fillers in the production of plastics to improve the physical properties of those plastics.

Conventional screw extruders of the type described for example by H. Herrmann in "Schneckenmaschinen in der Verfahrenstechnik", Springer, Verlag, Berlin-Heidelberg-New York, 1972, pages 161-170, are suitable for carrying out the process according to the present invention. Multiple-screw (preferably twin-screw) double-flighted and triple-flighted extruders having meshing screws which rotate in the same direction and which continuously scrape against one another and also against the inner barrel wall (such as those described in German Pat. No. 862,668 and German Auslegeschrift No. 2,302,564 (U.S. Pat. No. 3,963,679)) are particularly suitable.

In addition to thread-like "delivery elements", the screws advantageously have special "kneading elements" positioned just beyond the point at which the reaction components are introduced into the extruder. These special "kneading elements" (described in German Pat. Nos. 813,154 and 940,109) have an increased shearing and mixing effect. Kneading elements of this type may also be used with advantage elsewhere in the extruder, for example, near the product outlet.

It is preferred to use extruders having a continuous self-cleaning effect and which provide for forced delivery in a short residence time. The screw system should also provide for intensive forced convection which, in addition to an intensive mixing effect, also results in excellent heat transfer conditions along the inner barrel wall. Such heat transfer conditions are of considerable importance to control of temperature in the process according to the present invention.

In the process of the present invention, the liquid starting compounds may be continuously introduced (in the required ratio) into a screw reactor by means of suitable, standard commercial pumps, such as, for example, reciprocating pumps, membrane pumps, rotary-slide pumps or gear pumps. It is preferred that such liquids be added in premixed form. Solids may be continuously introduced into the screw reactor by means of suitable metering units such as vibrating chutes, metering screws or distributing belt weighing machines. It is preferred that the screw reactor be so equipped as to permit both cooling and heating up of the reaction mixture.

The main starting component for the process of the present invention is the NCO-group-containing TDI residue tars (described above in detail) which accumulate in the production of monomeric TDI on an industrial scale. In special cases, the TDI residue tar may also be used in admixture with other monofunctional and/or polyfunctional isocyanates. For economic reasons, however, these additional isocyanates are used, if at all, in small quantities, i.e., in quantities of less than about 50% by weight and preferably in quantities of less than 30% by weight (based on the quantity of the TDI residue tar).

Isocyanates which may also be used in the present invention are aromatic polyisocyanates corresponding to the formula

R(NCO)$_n$ in which $n$ is a whole number or where isocyanate mixtures are used, a statistical average of from 1.5 to 3, preferably 2, and R represents an aromatic hydrocarbon radical with a total of 6 to 30 carbon atoms which may be substituted by one or more alkyl, cycloalkyl, alkoxy, phenoxy or halogen radicals and/or which may contain alkylene radicals between aromatic rings as bridged members, preferably represents an aromatic hydrocarbon radical with a total of 6 to 15 carbon atoms which may be substituted by methyl or contain methylene bridges.

Examples of aromatic diisocyanates represented by this formula are monomeric 2,4-diisocyanatotoluene; 2,6-diisocyanatotoluene; mixtures of these isomers; 4,4'-diisocyanatodiphenyl methane and its isomers which may be alkyl or halogen-substituted; 4,4'-diisocyanatodiphenyl propane; 1,4-diisocyanato-2-chlorobenzene; 4,4'-diisocyanato-3,3'-dichlorodiphenyl methane; 1,4-diisocyanato-3-methoxy benzene; 1,4-diisocyanato-3-phenoxy benzene and diisocyanato-dimethylbiphenyl.

Monofunctional isocyanates which may optionally be used in the process of the present invention are phenyl isocyanate and p-tolyl isocyanate. Trifunctional and higher aromatic polyisocyanates which may also be added to the TDI residue tar are the more than difunctional polyisocyanates of the diphenyl methane series which are always present in the phosgenation products of aniline/formaldehyde condensates; modified polyisocyanates containing urethane or urea groups, such as the addition product of 5 moles of 4,4'-diphenyl methane diisocyanate and 1 mole of tripropylene glycol, and by-products from the production of these modified polyisocyanates. Where high-melting diisocyanates are used, small quantities of organic solvents may be used where it is desirable to lower the melting point of such diisocyanates. If they are used at all, it is preferred to use only those additional polyisocyanates which are liquid under the temperature conditions of the process according to the present invention.

It is of course also possible to use mixtures of all of the above-mentioned isocyanates.

The other main starting component in the process according to the present invention is formed by compounds containing alcoholic groups and having an average molecular weight below 600 and preferably below 300. Particularly suitable compounds of this type are low molecular weight glycols, such as ethylene glycol, diethylene glycol, triethylene glycol, tetraethylene glycol, the homologous propylene glycols, and also sump residues of the type which are left in the commercial production of ethylene or propylene glycol from the corresponding alkylene oxides. It is also possible to use butane-, butene- and hexane-diol or a low molecular weight trihydric alcohol, such as glycerol (preferably in admixture with glycols). Monohydric alcohols, preferably those having a boiling point of 150° C., may also be used in admixture with the other alcohols, particularly where those other alcohols are trihydric alcohols. Inclusion of monohydric alcohols is advisable where a dispersing effect is desired, e.g., in cases where the process products are to be subsequently mixed with H-acid compounds of relatively high molecular weight.

Glycols which, in addition to their alcoholic function, contain polyurea groups are less suitable than other glycols to the practice of the present invention. Glycols of this type make only a very limited contribution to the development of thermoplastic segments in the polyaddition product and, for this reason, should be used primarily in admixture with other glycols. Glycols containing ester, acetate or ether groups are, however, particularly suitable to the present invention. Ethylene, diethylene, 1,2-propylene and dipropylene glycol, 1,4-butane diol and the above-mentioned distillation residues from the production of ethylene and propylene glycol and mixtures thereof are particularly preferred for the purposes of the process according to the present invention.

Where it is desired to make the products of the process of the present invention hydrophilic, cationic groups and/or anionic groups and/or groups capable of salt formation may be introduced into the polyaddition product during or after the isocyanate polyaddition reaction. One method for including such groups in the product is addition of isocyanate-reactive compounds containing tertiary nitrogen or sulfonic acid groups (for example, N-methyl diethanolamine or the addition product of bisulfite with 2,3-butene diol) to the reaction mixture. Another approach is to make the process products hydrophilic by allowing $SO_3$ or $ClSO_3H$ (suspended in chlorinated hydrocarbons) to act on the fully reacted, finely powdered polyaddition products, then hydrolyze and convert the sulfonic acid groups into the salt form with materials such as amines, ammonia or alkali.

The highly branched and cross-linked TDI residue tar may be used in liquid or solid form for the reaction with the above-mentioned hydroxyl compounds. In either case, it is possible to produce polyaddition products capable of thermoplastic processing. These polyaddition products of the present invention are therefore significantly different from the denatured TDI residues of the prior art. As was discussed above, denaturing of the TDI residue tar with water leads to derivative products which cannot be molded homogeneously even under extreme conditions (for example, temperatures far above 200° C. and pressures above 100 bars), due to their inadequate thermoplasticity. Therefore, pressings having a tablet-like consistency which may readily be disintegrated between the fingers are obtained from denatured TDI residue tar in contrast to the molded products achievable with the polyaddition products of the present invention.

The tar-like distillation residue which accumulates in the production of monomeric tolylene diisocyanates can be kept only briefly (for a few hours) in the form of a liquid of sufficiently low viscosity to permit metering by standard pumps because the free isocyanate groups enter into various cross-linking reactions. Therefore, it is advisable to deliver the sump phase of the TDI residue tar as it accumulates (still at a temperature of about 120° to 180° C.) into one of the above-described reaction extruders and to react it with the compounds containing alcoholic hydroxyl groups (which may also be delivered in liquid form) on a continuous basis. The residence time and the dissipation of heat by cooling are regulated in the extruder so that the exit temperature of the polyaddition products does not exceed 220° C. (preferably 180° C.) and the extruded material does not undergo any subsequent overheating. Overheating of the extruded material is undesirable because it causes severe embrittlement of the products and decomposition reactions accompanied by the evolution of gas. Depending upon the procedure employed, the polyaddition products containing urethane groups issue from the reaction extruder either in viscous, rapidly solidifying form or in the form of a free-flowing powder.

As can be seen from the Examples given below, the consistency of the process products may be affected within wide limits simply by varying the equivalent ratio of NCO- to OH-groups where the same starting components and comparable reaction conditions are employed. For example, where there is a large excess of OH-groups (isocyanate indices below 80), the reaction extruder delivers a viscous polyaddition product. In contrast, where there is a small excess of OH-groups (indices above 80) or substantially equivalent quantities of NCO- and OH-groups, a powder-form product substantially free from NCO-groups is recovered. Any residual isocyanate present in the polyaddition product reacts off completely within a few minutes.

In cases where it is not possible to use the freshly accumulating TDI residue tar immediately, the residue tar may still be used in the process according to the present invention even after intermediate storage for several weeks (at temperatures below 25° C.). In one such process, the tar-like sump phase of distillation may be initially run off from the distillation unit while still hot (approximately 130° to 180° C.) and introduced with cooling and in the absence of moisture into molds (for example, 1 to 3 cm thick slab molds) in which the tar solidifies rapidly to form a glass-like mass. After solidification, the product may be size-reduced to a particle size of less than 1 cm and preferably less than 0.5 cm in a suitable size-reducing machine (for example, in a cutting granulator or in a hammer mill) at temperatures of preferably below 25° C. and most preferably below 10° C. This irregular granulate may then be introduced under nitrogen into a multiple screw reaction extruder by means of a metering screw and a vibrating chute, heated and reacted with the compounds containing alcoholic hydroxyl groups in the manner described above.

In both variants of the process (i.e., immediate and delayed reaction with an alcoholic hydroxyl compound) polyaddition products having substantially the same properties are formed given substantially the same NCO-content of the TDI residue tar used, the same temperature profile and the same NCO/OH-equivalent ratio.

The present invention also relates to the use of the polyaddition products containing urethane groups produced by the above-described process as molding and sintering compositions. These reaction products of low molecular weight hydroxyl compounds and TDI residue tar obtained in accordance with the invention (which may be stored indefinitely) may be molded under pressure and at elevated temperature to form shaped articles. Molding is preferably carried out at temperatures in the range from 150° to 230° C. (most preferably from 170° to 200° C.) and under pressures of from 5 to 100 bars (most preferably from 10 to 40 bars). The powder-form products of the present invention have an apparent density of from 400 to 900 g/l depending upon their particle size. Therefore, both homogeneous moldings (1.2 to 1.3 g/cc) and cellular moldings (0.7 to 1.2 g/cc) may be produced from these powders, even without the use of a blowing agent. Homogeneous molded panels produced with these powders are characterized by extreme hardness, rigidity, comparatively good impact and flexural strength and pronounced flame resistance.

If desired, the polyaddition products produced in accordance with the present invention may be modified in various ways. For example, it is possible to mix the two main starting components of the process with a variety of additives before the polyaddition reaction or to introduce such additives into the reactor extruder. It is also possible to use other plastics (for example, polyamide) by solvating or completely dissolving them in the compound containing hydroxyl groups at elevated temperature. The TDI residue tar may then be introduced into the extruder where it undergoes polyaddition with the polyol (particularly ethylene glycol or diethylene glycol) acting as solvent for the polyamide so that the polyamide remains in completely homogeneous distribution in the process product. Use of such additional plastics increases the thermoplasticity and notched impact strength of the polyaddition products. It is also possible to introduce the additives in heterogeneous phase or to incorporate them into the process products at a later stage, for example, by means of extruders or mixing rolls. The polyaddition product obtained in accordance with the invention may also be worked into other plastics as a filler. These variants make the process according of the present invention extremely versatile with respect to the molding techniques which may be used and also with respect to the modifications and improvements obtainable in the physical properties and flame resistance of the process products. This versatility may also result in a significant reduction in the cost of otherwise expensive plastics without sacrifice of any of their valuable properties.

If the polyaddition reaction according to the present invention is carried out with a large excess of alcoholic hydroxyl groups, the products obtained will still contain free hydroxyl groups. Such products may be used in the form of fine powders (average particle size preferably less than 50 μm and, better still, less than 10 μm) as reactive fillers in the production of polyurethane plastics (including coating and gap-filling compositions and heat-resistant adhesives).

The production of homogeneous or cellular polyurethane plastics may be carried out by methods known to those in the art with the polyaddition products containing reactive groups (particularly hydroxy alkyl and urethane groups) used as starting materials in the role of cross-linkable fillers and, optionally as chain-extending agents.

Accordingly, the present invention also relates to a process for the production of optionally cellular, flame-resistant polyurethane plastics by the polyaddition of polyisocyanates and, optionally, compounds containing isocyanate-reactive groups in the presence of filler containing groups which are reactive in the context of the isocyanate polyaddition reaction and, optionally activators, blowing agents, other fillers and other additives known to those in the art. The polyaddition products containing polyurethane groups of TDI residue tar and low molecular weight alcohols produced in accordance with the invention are used as the filler.

Polyisocyanates, additives and, optionally, additional compounds containing isocyanate-reactive groups (particularly high molecular weight and low molecular weight polyols and polyamines) suitable for the production of the polyurethane plastics are known to those in the art. Suitable production processes are described in German Offenlegungsschrift Nos. 2,302,564; 2,423,764 (U.S. Pat. No. 3,963,679); 2,550,796; 2,550,797 and 2,550,833 (U.S. Pat. Nos. 4,093,569 and 4,147,680).

In addition to the polyisocyanate polyaddition reactions, the polyaddition products produced in accordance with the present invention may be used in any other reactions in which the reaction products of TDI residue tar and alcohols can take part through their reactive groups (i.e., hydroxyl and urethane groups, or even olefinically unsaturated groups if unsaturated alcohols are used in the polyaddition reaction or if the products have been reacted with unsaturated carboxylic acids). Examples of such reactions are polycondensation reactions of carbonyl compounds with aminoplast and/or phenoplast monomers, epoxide resins, cyanate resins and (co)polymerization reactions with vinyl monomers.

The homogeneous or cellular plastics obtained when the polyaddition products of the present invention are employed (particularly polyurethane foams, coatings, lacquers, adhesives, gap-filling compounds and sizing agents) are characterized by improved physical properties and by increased tensile strength and reduced flammability. Where the products of the present invention are used in making such plastics, relatively small quantities of isocyanate may be employed in polyurethane formulations in which very large quantities of isocyanates would normally be used. Since large quantities of isocyanate frequently lead to extremely high reaction temperatures which are difficult to regulate and which damage the properties of the polyurethane plastics, it is particularly advantageous that the polyaddition reaction of the present invention takes place at more moderate reaction temperatures. In many cases, the properties of the plastics obtained using the polyaddition products of the present invention may be varied by using other organic and/or inorganic fillers. Materials containing lignocellulose (particularly woodchips and waste) of the type mentioned in German Offenlegungsschrift No. 2,325,926 (U.S. Pat. No. 3,870,664), may be used particularly as such additional filler materials. It is possible to use the TDI residue tars reacted with alcohols in accordance with the present invention in the production of boards or shaped articles by the compression molding of lignocellulose-containing fiber shavings or layers mixed with a suitable binder (for example, polyisocyanate and/or condensation products of formaldehyde with urea, melamine and/or phenol). The polyaddition product may be present in such a mixture in a quantity of up to about 95% by weight and preferably in a quantity of from 5 to 60% by weight (based on the total weight of the shaped article). Processes for the production of materials such as these are described in U.S. Pat. No. 3,870,665, DE-OS No. 1,669,759, DE-AS No. 1,653,169 and the literature cited therein.

The present invention is illustrated by the following Examples which should not be construed as limiting the scope of the invention. The quantities given therein represent parts by weight and percent by weight, unless otherwise indicated.

EXAMPLES

Tolylene diisocyanate distillation residues which had accumulated as sump phase in the vacuum distillation of monomeric 2,4-/2,6-TDI (80:20 isomer mixture) from the crude phosgenation product of tolylene diamines and which had been isolated in the form of a tar-like, hot (150°-180° C.) viscous mass containing from 21.0 to 26.9% by weight of free isocyanate groups, were used in these Examples.

The reaction extruders I and II (Werner & Pfleiderer Type ZSK) used in Examples 1 to 11 were twin-screw extruders comprising meshing screws rotating in the same direction and were made up of heatable and coolable segments of equal length. The characteristics of each of these extruders are given in the following Table.

| Reaction Extruder | I | II |
| --- | --- | --- |
| External screw diameter [mm] | 530 | 500 |
| Length [mm] | 2280 | 1600 |
| Number of segments | 12 | 8 |

Description of Test Using Reactor I

A tar-like tolylene diisocyanate distillation residue A containing 26.9% by weight of free, largely polymer-bound isocyanate groups was kept in liquid form in a stirrer-equipped autoclave at a temperature of from 100° to 110° C. and under a nitrogen pressure of 0.2 bar. This residue was continuously introduced by means of a gear pump through a heated pipe into segment #9 of the reaction extruder. Diethylene glycol was introduced at room temperature into segment #6 preceding segment #9 in the direction of flow. The reactants were mixed intensively in the reaction extruder. Since the reaction was exothermic, the barrel of the extruder was cooled with water in such a way that its temperature remained below 165° C. The formulation used in each of the Examples and the specific reaction conditions are shown in Table 1.

The reaction products discharged from the reaction extruder were distributed uniformly in 2 to 5 cm thick layers over steel plates, stored for at least 1 hour with gradual cooling in an unheated recirculating air vessel and then packed in polyethylene bags. For subsequent use (see application Examples 12 to 19), the products were, if necessary, size-reduced in a hammer mill to particle sizes of less than 1 mm or were treated in an air stream mill for the purpose of fine grinding (average particle sizes less than 200 $\mu$m) or in an air jet mill for the purposes of ultra-fine grinding (average particle sizes less than 20 $\mu$m).

Description of Test Using Reactor II

A tar-like TDI residue B which had accumulated as sump phase in the production of tolylene diisocyanate and which contained only 21.0% by weight of free, almost exclusively polymer-bound isocyanate groups was cooled in the absence of moisture in the form of 1 to 2 cm thick slabs. This cooled residue was then size-reduced in a hammer mill to particle size of less than 5 mm.

The cooled, irregular granulate was introduced by a metering screw into segment #1 of the reaction extruder and melted in segments #1 to #6 kept at 180° C. (barrel temperature). Diethylene glycol was introduced into segment #6 by means of a reciprocating pump without any further application of heat and then reacted with the TDI residue. The rest of the procedure was the same as described above in reference to reactor I. The formulations used and the specific reaction conditions employed are given in Table 2.

EXAMPLES 1-7

TABLE 1

Formulations and Reaction Conditions Used in Reactor I

| | EXAMPLE NO. | | | | | | |
| --- | --- | --- | --- | --- | --- | --- | --- |
| | 1 | 2 | 3 | 4 | 5 | 6 | 7 |
| TDI-tar A (parts by wt.) | 65.4 | 68.8 | 70.2 | 71.5 | 72.6 | 73.7 | 74.7 |
| Diethylene glycol (parts by wt.) | 34.6 | 31.2 | 29.8 | 28.5 | 27.4 | 26.3 | 25.3 |
| Index* | 60 | 75 | 80 | 85 | 90 | 95 | 100 |
| Product Exit Temperature (°C.) | 160 | 165 | 170 | 175 | 185 | 185 | 190 |

*Index = 100 × NCO/OH-equivalent ratio

The constant reaction conditions employed in Examples 1-7 were as follows:

| Total throughput (kg/h) | 60–70 |
| --- | --- |
| Screw speed (min$^{-1}$) | 270–320 |
| Residence time of the reaction mixture (approx. mins.) | 1–2 |
| Barrel temperatures (°C.) | |
| Segments 1–8 | 30 |
| 9–10 | 100–120 |
| 11–12 | 120–140 |

Where a large excess of OH-groups was used (Examples 1 and 2, indices <80), the polyaddition products were discharged from the reactor in highly viscous form and immediately solidifed in irregular form. Where the index was high (Examples 3 to 7), the products uniformly distributed over steel plates in the form of layers up to 5 cm thick were obtained in a coarse slag-like to finely powdered form. The products of Examples 3–7 were then cooled in an unheated recirculating air cabinet. After 1 hour, no more free isocyanate groups were detected. The softening or melting points were in the range from 200° to 260° C. where the index was below 80 and in the range from 290° to 320° C. where the index was below 90.

The process products swelled in boiling dimethyl formamide. They were, however, soluble in boiling ethylene glycol in which they underwent glycolysis (degradation reaction).

EXAMPLES 8-11

TABLE 2

| | EXAMPLE NO. | | | |
|---|---|---|---|---|
| | 8 | 9 | 10 | 11 |
| TDI-tar B+ (parts by wt.) | 75.12 | 77.26 | 78.19 | 79.05 |
| Diethylene glycol | 24.88 | 22.74 | 21.81 | 20.95 |
| Index* | 80 | 90 | 95 | 100 |
| Product Exit Temperature (°C.) | 145 | 160 | 180 | 185 |

+(21.0% by weight NCO)
*Index = 100 × NCO/OH-equivalent ratio

The reaction conditions which were constant in Examples 8-11 were as follows:

| Total throughput (kg/h) | 22 |
|---|---|
| Screw speed (min$^{-1}$) | 80-90 |
| Residence time of the reaction mixture (approx. 2-3 mins.) | 2-3 |
| Barrel temperature | |
| Segments 1-3 | 171-175° C. |
| 4-5 | 189-192° C. |
| 6-8 | 93-105° C. |

The polyaddition products were discharged from the reactor in the form of a powder or granulate. On cooling, the primary particles which were approximately 0.5 to 2 mm in diameter formed loose agglomerates up to 10 mm in diameter. The free NCO-group content amounted to less than 2% by weight after 1 hour (at the low product exit temperatures) and to less than 0.2% by weight (for product exit temperatures above 175° C.). The process products could not be melted below 300° C.

APPLICATION EXAMPLES 12 TO 15
(PRESS-MOLDING WITHOUT FILLERS)

2 and 4 mm thick press-molded board having a unit weight of from 1.25 to 1.32 g/cc were produced from the polyaddition products obtained in accordance with the invention by the following general procedure.

The reaction product was size-reduced by means of a hammer mill and/or air jet mill to an average particle size of less than 300 μm and then scattered uniformly over a steel plate bounded by a frame. The scattered particles were then preheated under gentle pressure for 20 to 40 seconds in a press heated to 150°-200° C., briefly relieved of pressure and finally, press-molded under a pressure of 40 to 50 bars. The press-molding time amounted to approximately 30 seconds per mm of board thickness. The reaction product obtained in accordance with Example 1 having a high content of terminal hydroxy alkyl groups was wetted uniformly in the form of a fine powder with the equivalent quality of crude 4,4'-diphenyl methane diisocyanate (NCO content: 30.1% by weight) in Example 13. Such a wetted powder may be press-molded either immediately or at a later stage. By virtue of their very high dimensional stability under heat, the press-molded process products could be directly removed from the molds without any need for cooling.

The water repellent molded boards obtained in accordance with the invention were resistant to chemicals and to weather and did not drip, even when exposed to the flame of an oxygen torch. If the flame was removed after several minutes, soft-extinguishing occurred.

The composition and physical properties of each of the molded boards produced in Examples 12-15 are given in Table 3.

TABLE 3

| | EXAMPLE NO. | | | |
|---|---|---|---|---|
| | 12 | 13 | 14 | 15 |
| Product of Production Example No. | 1 | 1 | 7 | 10 |
| Addition of Crude 4,4'-diphenyl methane diisocyanate (based on index) | — | 100 | — | — |
| Press-molding Temperature (°C.) | 150 | 170 | 190 | 210 |
| Ball Indentation Hardness H30 (MPa) (DIN 53 456) | — | 285 | 318 | 310 |
| Bending Test: E-modulus (MPa) (ISO R 178) Flexural | — | 4600 | 4530 | 4460 |
| strength (MPa) | — | 91 | 48 | 36 |
| deflection (%) | — | 2 | 1.2 | 0.9 |
| Tensile Test: E-modulus (MPa) | — | 4520 | 5250 | 4800 |
| (DIN 53 455 Tensile strength (MPa)) | — | 56 | 33 | 29 |

The molded boards obtained in accordance with Example 12 were extremely brittle in contrast to Example 13.

APPLICATION EXAMPLES 16 TO 19
(PRESS-MOLDING WITH WOODCHIPS)

0.5 to 1.5 cm long soft woodchips containing from 8.5 to 9.5% by weight of water were used in each of these Examples. Immediately before use, they may be wetted with crude diphenyl methane diisocyanate having isocyanate content of 30.1% by weight.

10 to 16 mm thick boards were produced as follows from the mixture (characterized in Table 4 below) of glue-covered woodchips and the polyaddition products produced in accordance with the invention at press-molding temperatures of from 170° to 210° C., under a pressure of from 30 to 70 bars and with a press-molding time of from 10 to 30 seconds per mm board thickness. Examples 18 and 19 illustrated statistical distributions of mixture components useful in press moldings. In Example 16, a sandwich structure with a surface layer solely of TDI residue tar modified in accordance with the invention and a pure woodchip core was made. In Example 17, an integral chipboard with a content of TDI residue tar modified in accordance with the invention which increased from inside outwards was made. In every case, the layers scattered over steel plates in the specified sequence were bonded under heat in a single pressing operation to form boards having a unit weight of from 750 to 900 kg/m³.

TABLE 4

| Example | Example No. of TDI Residue Used | Amount TDI Residue (parts by wt.) | Amount Wood (parts by wt.) | Amount bonding agent* (wt. %, based on wood) | SURFACE LAYER | | |
|---|---|---|---|---|---|---|---|
| | | | | | Amount Polyaddition Product (wt. %) | Amount Wood (wt. %) | Amount Bonding Agent* (wt. %) |
| 16 | 7 | 30 | 70 | 6 | 100 | — | — |
| 17 | 7 | 22 | 78 | 6 | 75 | 25 | 6 |
| 18 | 9 | 75 | 25 | 0 | — | — | — |

TABLE 4-continued

| | | | | | | | |
|---|---|---|---|---|---|---|---|
| 19 | 10 | 50 | 50 | 6 | — | — | — |

| Example | Amount Polyaddition Product (wt. %) | INTERMEDIATE LAYER Amount Wood (wt. %) | Amount Bonding Agent* (wt. %) | CORE Amount Wood (wt. %) | Amount Bonding Agent* (wt. %) |
|---|---|---|---|---|---|
| 16 | — | — | — | 100 | 6 |
| 17 | 17 | 83 | 6 | 100 | 6 |
| 18 | — | — | — | — | — |
| 19 | — | — | — | — | — |

*crude diphenyl methane diisocyanate

The woodchip boards produced in accordance with Examples 16 to 19 had the following significantly improved properties: increased hardness, smoothness and flexural strength, greatly reduced swelling on contact with water and reduced flammability. In many cases, there was no need for any finishing work because the chipboards could be sawed and drilled without splintering.

What is claimed is:

1. A process for the production of polyaddition products containing urethane groups in which an isocyanate-group-containing distillation residue obtained in the commercial production of tolylene diisocyanate is reacted continuously with a compound having an average molecular weight of less than 600 and containing at least two alcoholic hydroxyl groups in an NCO/OH equivalent ratio less than 1.5:1 at a temperature in the range of 50° to 220° C. in a reaction extruder.

2. The process of claim 1 wherein the reaction extruder is a multiple screw reaction extruder with self-cleaning properties having screws which rotate in the same direction.

3. The process of claim 1 wherein the distillation residue contains less than 12 wt. % monomeric tolylene diisocyanate, has a free NCO-group content of less than 35 wt. % and has a softening point below 200° C.

4. The process of claim 1 wherein the alcoholic hydroxyl compound also contains ionic groups and/or groups capable of salt formation.

5. The process of claim 1 wherein the distillation residue is substantially monomer free.

6. The process of claim 1 wherein the distillation residue contains less than 27 wt. % free isocyanate groups.

7. The process of claim 1 wherein the distillation residue has a softening point of from 50° to 160° C.

8. The process of claim 1 wherein the alcoholic hydroxyl compound is a glycol having a molecular weight of from 62 to 300.

9. The process of claim 1 wherein the NCO/OH equivalent ratio is maintained within the range of 0.4:1 to 1:1.

10. The process of claim 1 wherein the tolylene diisocyanate distillation residue freshly accumulating as the sump phase of distillation is directly and continuously delivered into the reaction extruder.

11. A molding composition made by continuously reacting an isocyanate-group-containing distillation residue obtained in the commercial production of tolylene diisocyanate with a compound having a molecular weight less than 600 and containing at least two alcoholic hydroxyl groups in an NCO/OH equivalent ratio of less than 1.5:1 at temperatures in the range of 50° to 220° C. in an extruder reactor.

12. The molding composition of claim 11 in which a material containing lignocellulose is also included in the reaction mixture.

13. A reactive filler useful in the production of plastics by polycondensation and polymerization reactions which is produced by continuously reacting an isocyanate-group-containing distillation residue obtained in the commercial production of tolylene diisocyanate with a compound having a molecular weight less than 600 and containing at least two alcoholic hydroxyl groups in an NCO/OH equivalent ratio of less than 1.5:1 at temperatures in the range of 50° to 220° C. in a reaction extruder.

14. A process for the production of a flame-resistant polyurethane plastic by the polyaddition of
    (a) a polyisocyanate; and
    (b) a reactive filler produced by continuously reacting an isocyanate-group-containing distillation residue obtained in the commercial production of tolylene diisocyanate with a compound having a molecular weight less than 600 and containing at least two alcoholic hydroxyl groups in an NCO/OH equivalent ratio of less than 1.5:1 at temperatures in the range of 50° to 220° C. in a reaction extruder.

15. The process of claim 14 wherein a compound containing isocyanate-reactive groups is also used as a polyaddition reactant.

16. The process of claim 15 wherein a compound taken from the group consisting of activators, blowing agents, fillers, additives and mixtures thereof is also used as a polyaddition reactant.

* * * * *